United States Patent
Hariharan et al.

(10) Patent No.: US 9,061,439 B2
(45) Date of Patent: *Jun. 23, 2015

(54) RECOVERY OF SILICON FROM KERF SILICON WASTE

(75) Inventors: Alleppey V. Hariharan, Austin, TX (US); Jagannathan Ravi, Bedford, MA (US)

(73) Assignee: SEMLUX TECHNOLOGIES, INC., Bedford, MA (US)

(*) Notice: Subject to any disclaimer, the term of this patent is extended or adjusted under 35 U.S.C. 154(b) by 668 days.

This patent is subject to a terminal disclaimer.

(21) Appl. No.: 12/535,618

(22) Filed: Aug. 4, 2009

(65) Prior Publication Data

US 2010/0032630 A1   Feb. 11, 2010

Related U.S. Application Data

(60) Provisional application No. 61/137,904, filed on Aug. 4, 2008, provisional application No. 61/197,714, filed on Oct. 30, 2008, provisional application No. 61/210,197, filed on Mar. 16, 2009, provisional application No. 61/197,718, filed on Oct. 30, 2008.

(51) Int. Cl.
   *C01B 33/02*   (2006.01)
   *B28D 5/00*    (2006.01)
   (Continued)

(52) U.S. Cl.
   CPC ............ *B28D 5/007* (2013.01); *C01B 33/021* (2013.01); *C01B 33/037* (2013.01); *C01B 33/04* (2013.01); *C01B 33/107* (2013.01); *C01B 33/10705* (2013.01); *C01B 33/10736* (2013.01)

(58) Field of Classification Search
   CPC .. C01B 33/021; C01B 33/037; C01B 33/039; C01B 33/08; C01B 33/1071; C01B 33/10742; C01B 33/10747; C01B 33/10752; C01B 33/113; C01B 33/10736; C01B 33/107; C01B 33/10705; C01B 33/04; C01B 33/02; H01B 1/04; B28D 5/007

See application file for complete search history.

(56) References Cited

U.S. PATENT DOCUMENTS 2,380,995 A   8/1945   Rochow
4,044,109 A   8/1977   Kotzsch et al.
(Continued)

FOREIGN PATENT DOCUMENTS

WO   WO-2010/017231      2/2010
WO   WO-2010046751 A2   4/2010
(Continued)

OTHER PUBLICATIONS

Wang et al (NPL:"A novel approach for recycling of kerf loss silicon from cutting slurry waste for solar cell applications", Journal of Crystal growth 310, 2008, pp. 3403-3406).*

(Continued)

*Primary Examiner* — Melvin C Mayes
*Assistant Examiner* — Smita Patel
(74) *Attorney, Agent, or Firm* — Wilmer Cutler Pickering Hale and Dorr LLP

(57) ABSTRACT

A process for the recovery of silicon includes providing silicon-containing solids recovered from a silicon manufacturing process, said recovered silicon-containing solids being substantially free of semiconductor dopants; converting the recovered silicon-containing solids into gaseous silicon forms; subjecting to purification by minimal distillation; collecting the gaseous silicon forms as a condensed liquid of silicon-containing compounds; and utilizing the silicon-containing compounds for silicon deposition.

36 Claims, 11 Drawing Sheets

(51) Int. Cl.
*C01B 33/021* (2006.01)
*C01B 33/037* (2006.01)
*C01B 33/04* (2006.01)
*C01B 33/107* (2006.01)

(56) References Cited

U.S. PATENT DOCUMENTS

| | | | |
|---|---|---|---|
| 4,092,446 A * | 5/1978 | Padovani et al. | 427/213 |
| 4,224,297 A | 9/1980 | Straussberger et al. | |
| 4,379,777 A | 4/1983 | Boulos | |
| 4,388,080 A | 6/1983 | Kapur et al. | |
| 4,519,999 A | 5/1985 | Coleman et al. | |
| 4,526,769 A | 7/1985 | Ingle et al. | |
| 5,063,040 A | 11/1991 | Ruff | |
| 5,162,263 A | 11/1992 | Kunishima et al. | |
| 5,910,295 A * | 6/1999 | DeLuca | 423/337 |
| 6,780,665 B2 | 8/2004 | Billiet et al. | |
| 7,175,685 B1 | 2/2007 | Hariharan et al. | |
| 2002/0151737 A1 | 10/2002 | Kalchauer et al. | |
| 2003/0095909 A1 | 5/2003 | Nakagawa et al. | |
| 2004/0047797 A1 | 3/2004 | Block et al. | |
| 2005/0176218 A1 | 8/2005 | Jonczyk et al. | |
| 2005/0226803 A1 | 10/2005 | Pflugler et al. | |
| 2007/0231236 A1 | 10/2007 | Kajimoto et al. | |
| 2008/0056979 A1 | 3/2008 | Arvidson et al. | |
| 2009/0324819 A1 | 12/2009 | Kulkarni et al. | |
| 2010/0061911 A1 | 3/2010 | Hariharan et al. | |
| 2010/0061913 A1 | 3/2010 | Hariharan et al. | |
| 2011/0147979 A1 | 6/2011 | Fragiacomo | |

FOREIGN PATENT DOCUMENTS

| | | |
|---|---|---|
| WO | WO-2010127669 A1 | 11/2010 |
| WO | WO-2011051334 A3 | 5/2011 |

OTHER PUBLICATIONS

Wang et al., "A Novel Approach for Recycling a Kerf Loss Silicon from Cutting Slurry Waste for Solar Cell Applications," Journal of Crystal Growth, 310, Apr. 2008, pp. 3403-3406.
International Search Report and Written Opinion of the International Searching Authority for PCT/US09/52749, mailing date Nov. 13, 2009, 12 pages.
"Event Report: Solar Power 2006, San Jose, CA," Solar Energy Materials & Solar Cells vol. 91, Issue 5, Mar. 2007, pp. 440-444, author unknown, also available online at www.sciencedirect.com.
Barraclough, "Waste Not, Want Not!—A Case for Recycling Silicon Waste Powder Kerf," KGB Consulting Ltd., Nov. 2006, 7 pages, downloaded from www.kgbconsultingltd.com/downloads/Waste_Not_Want_Not.pdf.
Ciftja, et al, "Refining and Recycling of Silicon: A Review," Norwegian University of Science and Technology, Trondheim, Feb. 2008, 40 pages.
Dong et al., "Beneficial and Technological Analysis for the Recycling of Solar Grade Silicon Wastes," JOM, vol. 63, No. 1, p. 23, 2011.
Khattak, "Silicon Utilization in a PV Plant," Solar Power 2006, Oct. 18, 2006, GT Solar Incorporated, Merrimack, New Hampshire, 9 pages.
Bailer, J.C. et al., "Inorganic Syntheses, Volume IV," Mcgraw-Hill Book Company, Inc., 222 pages (1953).
Grant & Hackh's Chemical Dictionary, Fifth edition, pp. 240-241, 4 pages (1987).
Moissan, Henri, "Fluorine," A lecture delivered by Prof. Henri Moissan before the Royal Institution of Great Britian, 14 pages (May 28, 1897).
Webster's II New Riverside University Dictionary, p. 490, 3 pages (1984).
WebChem.net: "Factors that affect the rate of a reaction", Jul. 17, 2002, taken from <http://web.archive.org/web/20020717100312/http://webchem.net/notes/how_far/kinetics/ratefactors.htm> (2 pages).
WebElements.com: Silicon, Sep. 9, 2013, taken from <http://web.archive.org/web/20080625075210/http://www.webelements.com/silicon/chemistry.html> (3 pages).

* cited by examiner

RECOVERY OF SILICON FROM KERF SILICON WASTE

CROSS-REFERENCE TO RELATED APPLICATIONS

This application claims the benefit of priority under 35 U.S.C. §119(e) to U.S. Patent Application No. 61/137,904 filed on Aug. 4, 2008, entitled "METHOD TO CONVERT KERF SILICON TO HIGH PURITY POLYSILICON," which is incorporated herein by reference in its entirety.

This application claims the benefit of priority under 35 U.S.C. §119(e) to U.S. Patent Application No. 61/197,714 filed on Oct. 30, 2008, entitled "METHOD TO CONVERT SILICON POWDER TO HIGH PURITY POLYSILICON THROUGH INTERMEDIATE SiF4," which is incorporated herein by reference in its entirety.

This application claims the benefit of priority under 35 U.S.C. §119(e) to U.S. Patent Application No. 61/210,197 filed on Mar. 16, 2009, entitled "RECOVERY OF SILICON FROM WIRE SAW KERF WASTE," which is incorporated herein by reference in its entirety.

This application claims the benefit of priority under 35 U.S.C. §119(e) to U.S. Patent Application No. 61/197,718 filed on Oct. 30, 2008, entitled "METHOD TO CONVERT SILICON POWDER TO HIGH PURITY POLYSILICON THROUGH INTERMEDIATE SiHCl3 OR SILANE," which is incorporated herein by reference in its entirety.

INCORPORATION BY REFERENCE

All patents, patent applications and publications cited herein are hereby incorporated by reference in their entirety in order to more fully describe the state of the art as known to those skilled therein as of the date of the invention described herein.

FIELD OF INVENTION

The present invention is directed towards recovery of silicon powder from multiple waste sources and conversion into high purity polysilicon. The polysilicon thus produced is primarily for use as feedstock for silicon-based semiconductor and photovoltaic manufacturing industries.

BACKGROUND OF THE INVENTION

The current mainstream method for producing high purity polysilicon for the electronic and photovoltaic (PV) industries is a combination of metallurgical and chemical. Starting from pure quartz ($SiO_2$), metallurgical grade silicon (MG-Si) is made by carbothermic reduction. This material is then converted into trichlorosilane (TCS, $SiHCl_3$) by reaction with HCl gas. After several purification processes via multiple distillations to remove all metallic and nonmetallic impurities present in MG-Si, the purified TCS gas is used to deposit ultra pure polycrystalline silicon. The processes, collectively called the Siemens Process, are very energy intensive.

The process flow to produce Silicon wafers is the following:

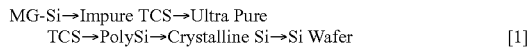
$$\text{MG-Si} \rightarrow \text{Impure TCS} \rightarrow \text{Ultra Pure TCS} \rightarrow \text{PolySi} \rightarrow \text{Crystalline Si} \rightarrow \text{Si Wafer} \quad [1]$$

Single or multi crystal silicon is grown from the polysilicon, leading to monocrystalline silicon rod/cylinder/boule or multicrystalline silicon block. These are then sawed into wafers. Process flow diagrams for the conventional production of MG-Si into Si wafers are shown in FIGS. 1 and 2.

Metallurgical grade silicon (MG-Si) is produced by a carbothermic reduction of silica in an arc furnace. This MG-Si material is inexpensive but is of very low (98%-99%) purity. Typical levels of impurities in MG-Si (in parts per million by weight) are: Fe 1550-6500 ppm, Al 1000-4350 ppm, Ca 245-500 ppm, Ti 140-300 ppm, C 100-1000 ppm, O 100-400 ppm, B 40-60 ppm, P 20-50 ppm and traces of such impurities as Mn, Mo, Ni, Cr, Cu, V, Mg and Zr. These residual impurities in MG-Si make it unsuitable for direct use as feedstock for the electronic and PV industries.

TCS is prepared by hydrochlorination of metallurgical grade MG-Si in a Fluidized Bed reactor with a gas stream of hydrogen chloride and hydrogen:

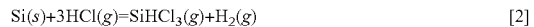
$$Si(s) + 3HCl(g) = SiHCl_3(g) + H_2(g) \quad [2]$$

The MG-Si is crushed and used in the form 40-200 micron grains. The reaction occurs at 300-350° C. normally without a catalyst. The reaction is highly exothermic ($\Delta H°$ reaction=−52 kcal/reaction), and accordingly the feed streams to the fluid bed are controlled. Competing reactions are

$$Si(s) + 4HCl(g) = SiCl_4(g) + 2H_2(g) \quad [3]$$

$$Si(s) + 2HCl(g) = SiH_2Cl_2(g) \quad [4]$$

which produce silicon tetrachloride (STC) and Dichlorosilane (DCS). The output of the hydrochlorination reactor is typically 95-97% TCS, 5-7% STC and 1-2% DCS, with all the impurity metal and nonmetal halides.

An alternate way of obtaining TCS from metallurgical grade MG-Si is by reaction with STC and hydrogen in a Fluidized Bed reactor in a process referred to as chlorination according to [5]:

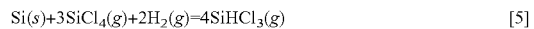
$$Si(s) + 3SiCl_4(g) + 2H_2(g) = 4SiHCl_3(g) \quad [5]$$

At 500° C. and 35 atm, about 20% TCS is produced with a 1:1 ratio of the reacting gases. The reaction [5] allows the use of pure STC, which is a common and plentiful byproduct of the silicon deposition process, to convert MG-Si to TCS.

The low boiling point of TCS (31.8° C.) and thus its comparatively high volatility lends itself to purification from the impurity halides and especially boron and phosphorus halides, and reduce such and all other impurities down to the parts per billion levels.

After separation of such high boiling metal chlorides as the transition metal chlorides, alkaline earth chlorides, and $AlCl_3$, the trichlorosilane undergoes a multiple purification through fractional distillation, to remove the high boiling volatile components, and then to remove the low boiling volatile components. These distillation purifications of the TCS contribute to more than 50% of the TCS plant operating costs.

Trichlorosilane is the predominant precursor chemical species for industrial polysilicon production due its high silicon deposition rates. High-purity TCS is vaporized, diluted with high-purity hydrogen and introduced into the deposition reactors. The gas is decomposed onto the surface of heated silicon seed rods, electrically heated to about 1100° C., to grow large rods of hyper pure silicon.

The main reactions are:

$$SiHCl_3(g) + H_2(g) = Si(s) + 3HCl(g) \quad [6]$$

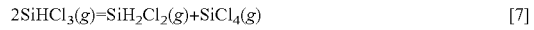
$$2SiHCl_3(g) = SiH_2Cl_2(g) + SiCl_4(g) \quad [7]$$

$$SiH_2Cl_2(g) = Si(s) + 2HCl(g) \quad [8]$$

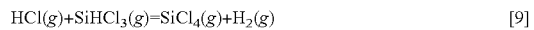
$$HCl(g) + SiHCl_3(g) = SiCl_4(g) + H_2(g) \quad [9]$$

Single pass process conversion efficiency is typical <20%. The stream of reaction by-products which leaves the reactor contains $H_2$, HCl, $SiHCl_3$ and $SiCl_4$. For plant efficiency these are recycled. The $SiCl_4$ is converted to $SiHCl_3$ and along with the unused $SiHCl_3$, the gas stream is recycled and utilized for polysilicon deposition.

More than 95% of the polysilicon for the semiconductor and PV industries is produced through the trichlorosilane route. While the typical polysilicon feedstock produced through the Siemens Process is of ultra high purity necessary and appropriate as demanded for the electronic grade (EG-Si grade, >99.99999%), its purity far exceeds the solar grade (SG-Si) purity requirements (SG-Si grade, >99.999%).

To a limited extent high purity polysilicon is also produced by the thermal decomposition of high purity silane ($SiH_4$) gas in a Siemens reactor. The latter is made from catalytic disproportionation (or redistribution) of high purity trichlorosilane according to:

$$4SiHCl_3(g)=SiH_4(g)+3SiCl_4(g) \quad [10]$$

Similarly, a lesser purity polysilicon is produced by decomposition of trichlorosilane or silane in a fluid bed reactor.

The polysilicon feedstock is utilized to grow large crystals of silicon for the electronic and PV industries. The electronic industry utilizes mainly the Czochralski process to grow ingots of single crystalline silicon. The photovoltaic industries utilize the Czochralski method only to a small extent. Their main crystal growth process forms multicrystalline silicon by the Heat Exchanger Method (HEM) or Directional Solidification System (DSS). These methods are amenable to grow very large quantities of the silicon crystal in the form of rectangular blocks, and are cost effective for the photovoltaic industry.

The single or multi crystalline silicon ingots or blocks are subsequently sliced into thin wafers by a wire saw or inner diameter saw process. These saw processes also produce significant silicon waste, known as kerf silicon waste, due to the cutting of the silicon ingot or block. While the processed wafer thicknesses are in the range 300 microns, the equivalent kerf loss is 200 microns thick. The semiconductor and photovoltaic industries produce significant quantities of kerf silicon waste during the wafer manufacturing operation. Slicing silicon ingot or block to make wafers is one of the most expensive and wasteful process steps in the silicon value chain, especially in the PV cell manufacturing industry. Kerf loss represents from 40% to 50% of the silicon ingot. This adds significantly to the silicon shortage of the PV industry and in addition, to PV cell manufacturing costs.

While the silicon wafer industry, in collaboration with the wire saw manufacturers, has developed practical processes to recover the cutting fluid and bulk of silicon carbide abrasive from the wafer cutting systems, recovering the silicon powder from the slurry has eluded the PV feedstock industry. The research project, RE-Si-CLE, through the European Community is the only reference for the limited attempt to recycle kerf waste and recover the silicon. This approach parallels the process scheme to directly purify MG-Si by a combination of metallurgical and pyrometallurgical methods. As of today the quality of any such recovered or produced polysilicon falls far short of the minimum specification for solar grade polysilicon.

Silicon is also lost in ingot shaping operations and due to lapping and other chemical mechanical operations on wafers. No serious attempts have been made to recover the silicon powder from these waste streams.

Currently, the primary attempt is metallurgical in nature, that is, to conserve the material aspect of the kerf silicon in the elemental form. However, the purification, separation from SiC and final recovery of Si from the kerf waste is highly dependent on the multitudes of chemical and other process steps. It is very doubtful that such methods will produce high purity PV grade silicon at reasonable cost. It is also certain that such process schemes will contribute to significant process wastes for disposal.

There are other process wastes in the semiconductor and photovoltaic industry that result in silicon powder though not contaminated to the extent that the kerf waste is. Ultra fine silicon powder results as a by-product to the extent of 15-20% of the Fluid Bed process to manufacture high purity electronic or PV grade granular polysilicon. This powder is of high purity, but cannot easily be recycled or used in silicon melting and crystal growth applications because of the finity of the powder. Silicon powder fines are also formed when silicon chunks are crushed to form granule size particles. While the polysilicon industry sometimes practices a simple melting process to recover the silicon dust waste, this process is ineffective, costly and inherently lacks purification of the material. Typical powder metallurgical process schemes to produce compacted silicon shapes and method that uses selective laser wavelengths and energies to densify and melt the silicon powder into granular shapes have been suggested to utilize silicon powder for various applications. As with the kerf silicon, the challenge is recovering the silicon dust waste and produce silicon of the correct or improved purity and process cost. The primary aim with respect to the high purity silicon dust is the conversion to more suitable morphologies for crystal growth at the lowest process cost.

SUMMARY

Methods are disclosed to recover silicon from silicon-containing solids recovered from a silicon manufacturing process, and produce high purity polysilicon at competitive costs. Methods are disclosed to provide robust, industrially practical and cost-effective methodology to convert recovered silicon into high purity polysilicon.

A viable and practical industrial process and technology to recover silicon powder wastes into a form that can be purified to an appropriate level and then converted to polysilicon that can be utilized as silicon feed stock for other applications is described. A process and technology that will maintain the purity of the silicon to the level specified either for the EG-Si or SG-Si is provided. The process scheme for the recovery and conversion can be applied on a commercially useful production rate.

The process uses a chemical conversion of the recovered silicon into gaseous form that can be purified appropriately. An optional physico-chemical head-end treatment of the silicon waste material can be performed prior to conversion to reduce impurities in the silicon waste material. High purity polysilicon can be realized from the high quality silicon waste very effectively through a final conversion to a halosilane gas (typically, trichlorosilane) and with subsequent no or minimum distillation-purification steps.

In one aspect, a method of converting kerf silicon waste to high purity polysilicon includes (a) optionally separating impurities from a kerf silicon waste to obtain a silicon enriched powder; (b) converting the silicon powder in the kerf silicon waste into halosilanes; (c) optionally submitting the halosilanes to distillation purification step; and (d) converting the purified halosilanes to silicon.

In any of the above noted embodiments, separating the impurities from the kerf silicon waste can include one or more of:

reducing the carrier fluid from the kerf silicon waste;
reducing metallic impurities from the kerf silicon waste;
reducing the abrasive content from the kerf silicon waste;
reducing oxidized material from the kerf silicon waste; and
washing and drying the kerf silicon waste.

In any of the above noted embodiments, the conversion of silicon powder in the kerf silicon waste into halosilanes is carried out using a process selected from the group consisting of hydrochlorination, chlorination, hydrobromination, bromination, hydrofluorination and fluorination, and optionally, the process is performed primarily in a bed reactor.

In any of the above noted embodiments, the purified halosilanes are decomposed in a silicon deposition process to deposit polysilicon or a silicon thin film.

In any of the above noted embodiments, the kerf silicon waste comprises high purity silicon, residual wire saw slurry and wire saw material, and for example, the residual wire saw slurry comprises a liquid carrier and an abrasive. Optionally, the liquid carrier is selected from the group consisting of polyethylene glycol, water and oil and mixtures thereof or the abrasive is selected from the group consisting of silicon carbide and diamond and mixtures thereof or the residual wire saw material is selected from the group consisting of iron, steel, stainless steel, brass coated iron, brass coated steel, brass coated stainless steel, or a combination of these.

In any of the above noted embodiments, the distillation process is selected to remove non-volatile and volatile impurities.

In any of the above noted embodiments, the non-volatile impurities comprise metal halide-containing impurities and silicon carbide.

In any of the above noted embodiments, the non-volatile impurities comprise metal halides and the metal halides are separated in a filter bed.

In any of the above noted embodiments, separating the kerf silicon waste comprises washing with water to remove water soluble impurities of the kerf silicon waste or separating the kerf silicon waste comprises washing the kerf silicon waste from oil-based wire saw process with an organic liquid extractant to remove oil.

In any of the above noted embodiments, magnetic metallic impurities in the kerf silicon waste are reduced by a magnetic separation system or metallic impurities in the kerf silicon waste are reduced by treating with acid to dissolve the metals.

In any of the above noted embodiments, the abrasive content of the kerf silicon waste is reduced by a density-based process and for example the density-based process is selected from the group consisting of centrifugation, flotation and momentum-based separation techniques.

In any of the above noted embodiments, the kerf silicon with the abrasive content, is washed with hydrofluoric acid to reduce oxidized silicon, and optionally, the hydrofluoric acid washed kerf silicon is washed with high purity water to remove hydrofluoric acid from the silicon.

In any of the above noted embodiments, the kerf silicon is dried in an inert gas environment.

In any of the above noted embodiments, the silicon is hydrochlorinated to form chlorosilanes, and in particular trichlorosilane and for example the hydrochlorination is performed using a mixture of hydrogen chloride gas and hydrogen gas or the hydrochlorination is performed at 200-500° C. or at 200-300° C.

In any of the above noted embodiments, the silicon is subjected to chlorination to form chlorosilanes, and in particular trichlorosilane and for example the chlorination is performed using a mixture of high purity silicon tetrachloride gas and hydrogen gas or the chlorination reaction is performed at about 300-700° C. at about 300-500° C.

In any of the above noted embodiments, the chlorosilanes comprise trichlorosilane and trichlorosilane is purified by distillation process to remove non-volatile and volatile impurities.

In any of the above noted embodiments, distillation to remove volatile impurities comprises separation of the trichlorosilane from dichlorosilane and tetrachlorosilane.

In any of the above noted embodiments, the chlorosilanes include trichlorosilane and further includes submitting the trichlorosilane to redistribution reactions to enrich the product in silicon content.

In any of the above noted embodiments, the method further includes converting the silicon enriched product into high purity silicon.

In any of the above noted embodiments, the silicon enriched product is decomposed in a silicon deposition process to deposit polysilicon or a silicon thin film In any of the above noted embodiments, the silicon is hydrobrominated to form bromosilanes, and in particular tribromosilane and for example the hydrobromination is performed using a hydrogen bromide gas and $H_2$ or the hydrobromination is performed at about 200-400° C.

In any of the above noted embodiments, the silicon is brominated to form bromosilanes, and in particular tribromosilane and for example the bromination is performed using a mixture of high purity silicon tetrabromide gas and hydrogen gas or the bromination is performed at about 300-600° C.

In any of the above noted embodiments, the bromosilanes include tribromosilane and tribromosilane is purified by distillation process to remove non-volatile and volatile impurities. In any of the above noted embodiments, distillation includes separation of tribromosilane from dibromosilane and tetrabromosilane.

In any of the above noted embodiments, the tribromosilane gas is decomposed in a silicon deposition process to deposit polysilicon or a silicon thin film.

In any of the above noted embodiments, the silicon is hydrofluorinated with HF to form silicon tetrafluoride and for example the hydrofluorination is performed at about 200-750° C. or the excess process gas HF and hydrogen and traces of moisture, are removed from the silicon tetrafluoride by selective condensation.

In any of the above noted embodiments, the silicon is fluorinated with $F_2$ to form silicon tetrafluoride and for example the fluorination is performed at about 200-500° C. or the silicon tetrafluoride is subsequently condensed to separate from the excess process gas $F_2$.

In any of the above noted embodiments, the method further includes reacting the fluorosilanes to form silane gas.

In any of the above noted embodiments, the silane gas is decomposed in a silicon deposition process to deposit polysilicon or a silicon thin film.

In one aspect a method of producing solar grade polysilicon includes converting a silicon powder recovered from kerf silicon waste into trichlorosilane; and optionally submitting the trichlorosilane to a distillation purification step to obtain a material quality sufficient for solar grade application; and converting such purified trichlorosilane to polysilicon.

In any of the above noted embodiments, the method further includes submitting the purified trichlorosilane to redistribution to form silane gas.

In any of the above noted embodiments, the trichlorosilane is subjected to one distillation purification.

In any of the above noted embodiments, no distillation step is employed to obtain a material quality sufficient for solar grade application.

In one aspect, a method of producing electronic grade polysilicon includes converting a silicon powder recovered from kerf silicon waste into trichlorosilane; and submitting the trichlorosilane to distillation purification steps to obtain a material quality sufficient for electronic grade application; and converting such purified trichlorosilane to polysilicon.

In any of the above noted embodiments, the method further includes submitting the purified trichlorosilane to redistribution to form silane gas.

In any of the above noted embodiments, the trichlorosilane is subjected to one or two distillation purification to realize a material quality sufficient for electronic grade application.

In one aspect, a silicon powder recovered from kerf silicon waste includes silicon particles having an average particle size in the range of 1-10 microns, about 5-10 weight % SiC; and less than 1 wt % metallic and nonmetallic impurities, wherein the surface of the silicon particles is substantially free of oxides.

The methods described herein utilize recoverable or other sources of silicon and produce the right quality feedstock material at the right cost for the photovoltaic industry and is expected to have a major impact on this industry whose growth demand and growth potential are strictly dependent on the availability of polysilicon.

BRIEF DESCRIPTION OF THE DRAWING

This invention is described with reference to the following drawings which are presented for the purpose of illustration only and are not intended to be limiting of the invention.

The reference process flow sheets currently utilized to convert MG-Si to high purity polysilicon and polysilicon to silicon wafers are described in FIGS. 1 and 2.

Figure 1:
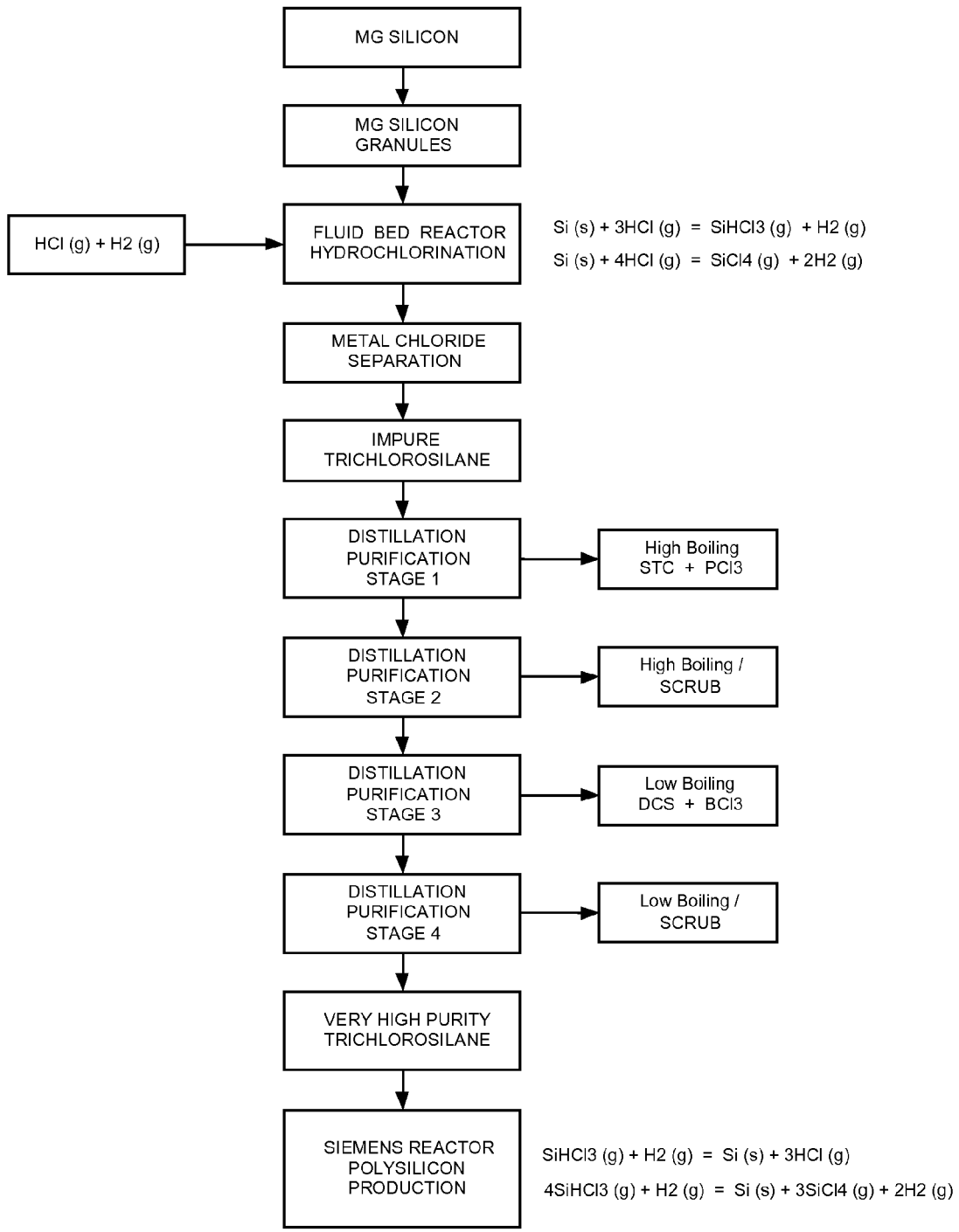
Figure 2:
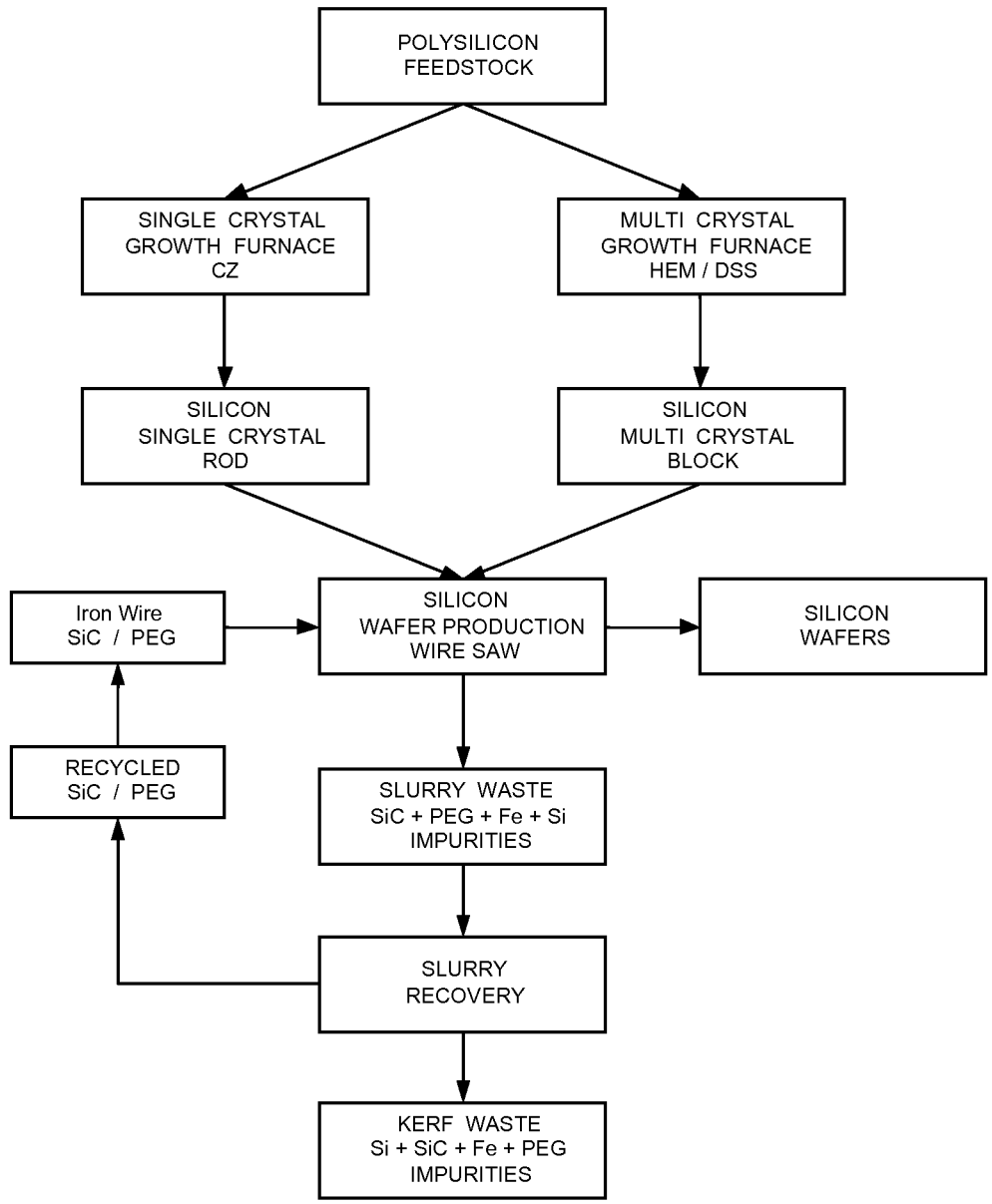
Figure 3:
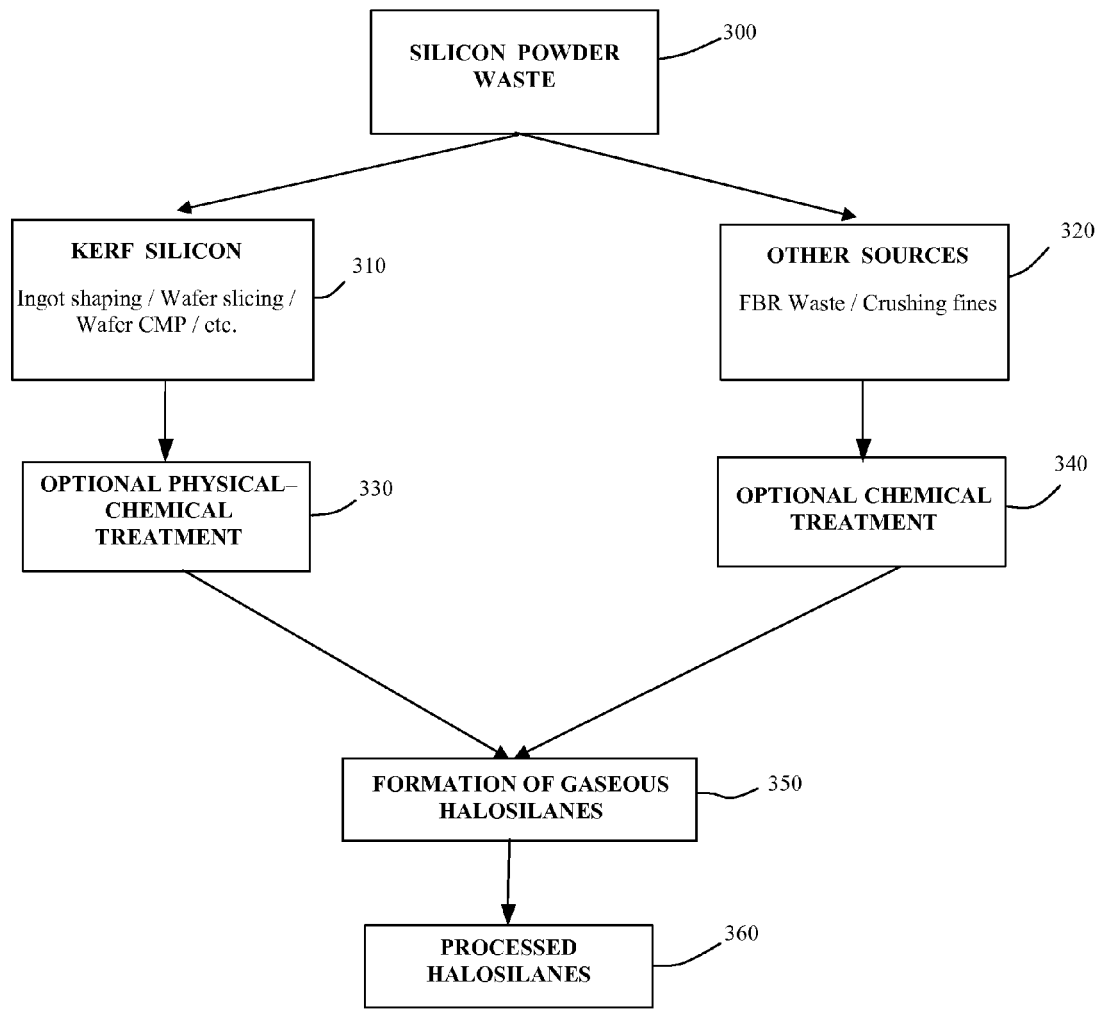

A generalized process scheme according to one or more embodiments of the present invention to process silicon powder wastes to TCS is shown in FIG. 3.

Figure 4:
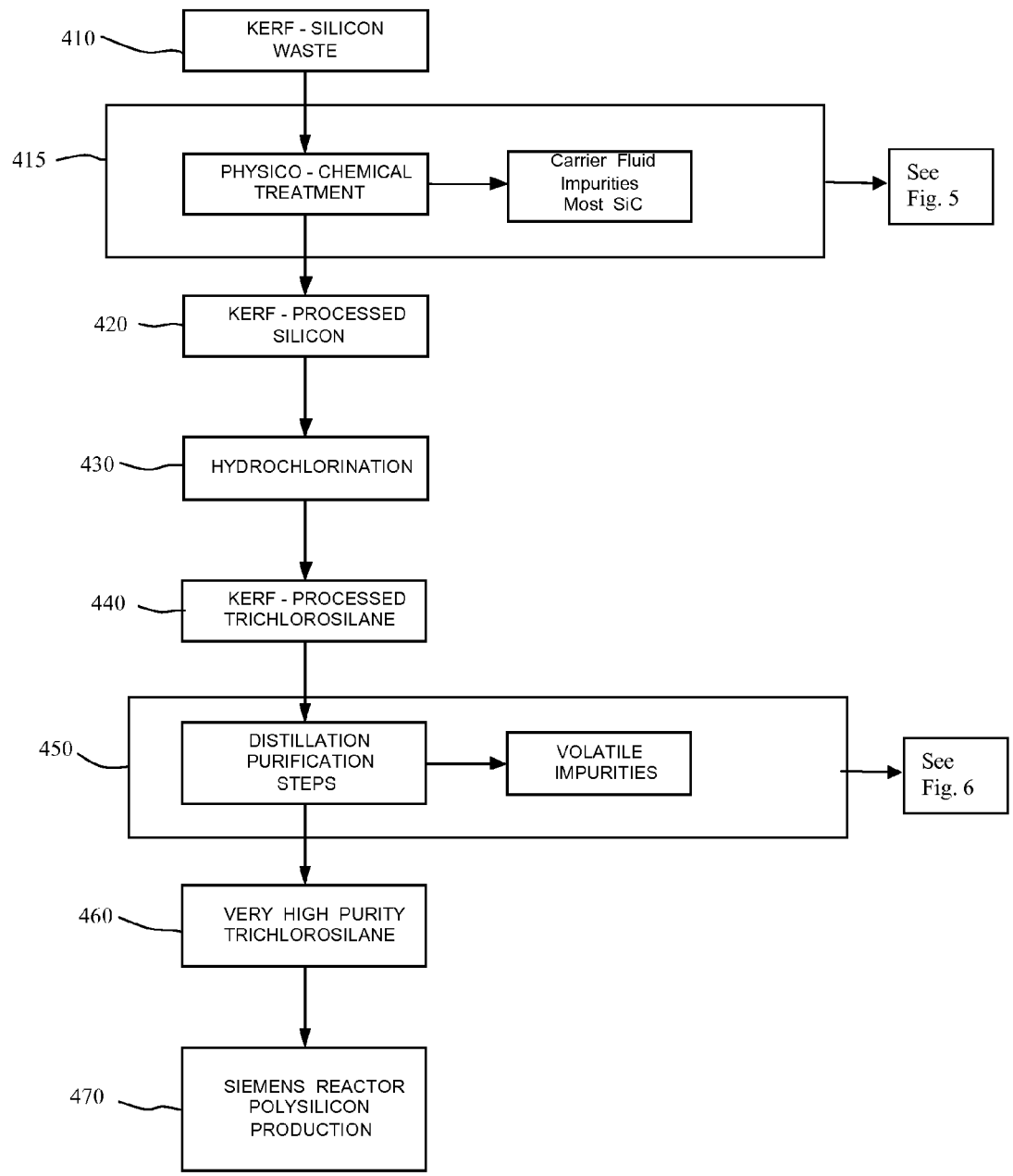

A process flow sheet of the present invention to process kerf silicon waste to polysilicon is shown in FIG. 4.

Figure 5:
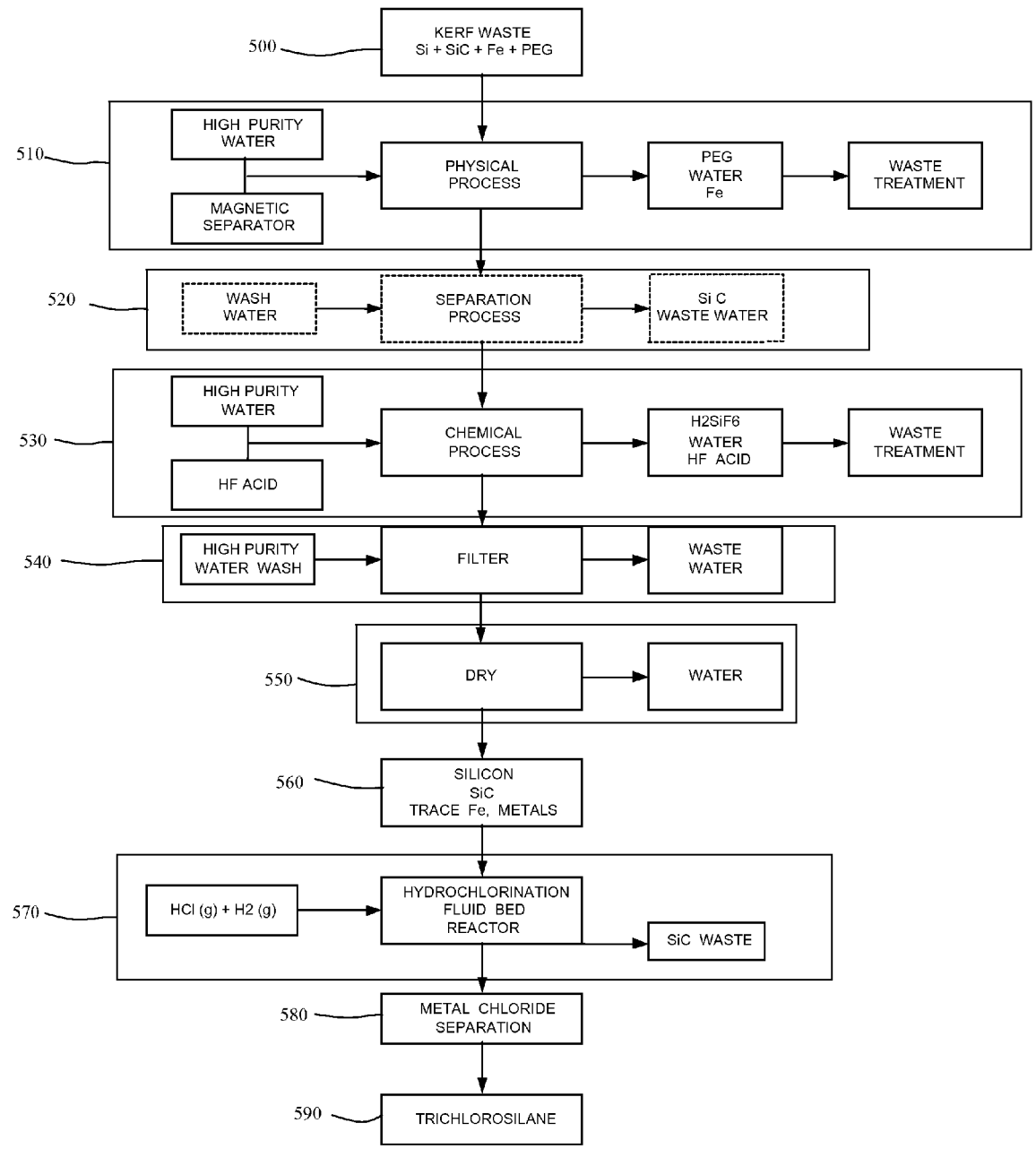

The process flow sheet according to one or more embodiments of the present invention to process kerf silicon waste to trichlorosilane is shown in FIG. 5.

Figure 6:
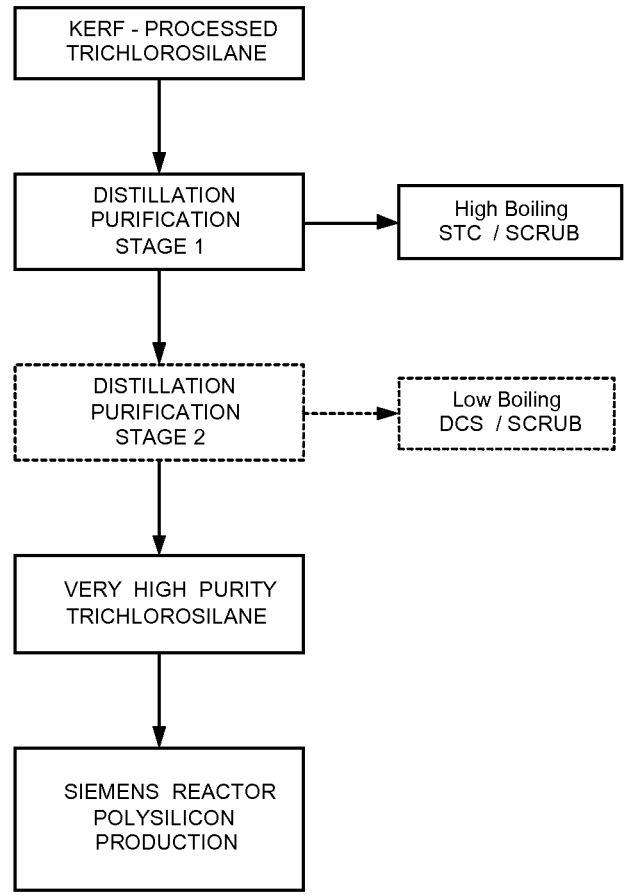

The process of purifying the kerf-recovered trichlorosilane to high purity trichlorosilane and converting to polysilicon according to one or more embodiments of the present invention is shown in FIG. 6.

Figure 7:
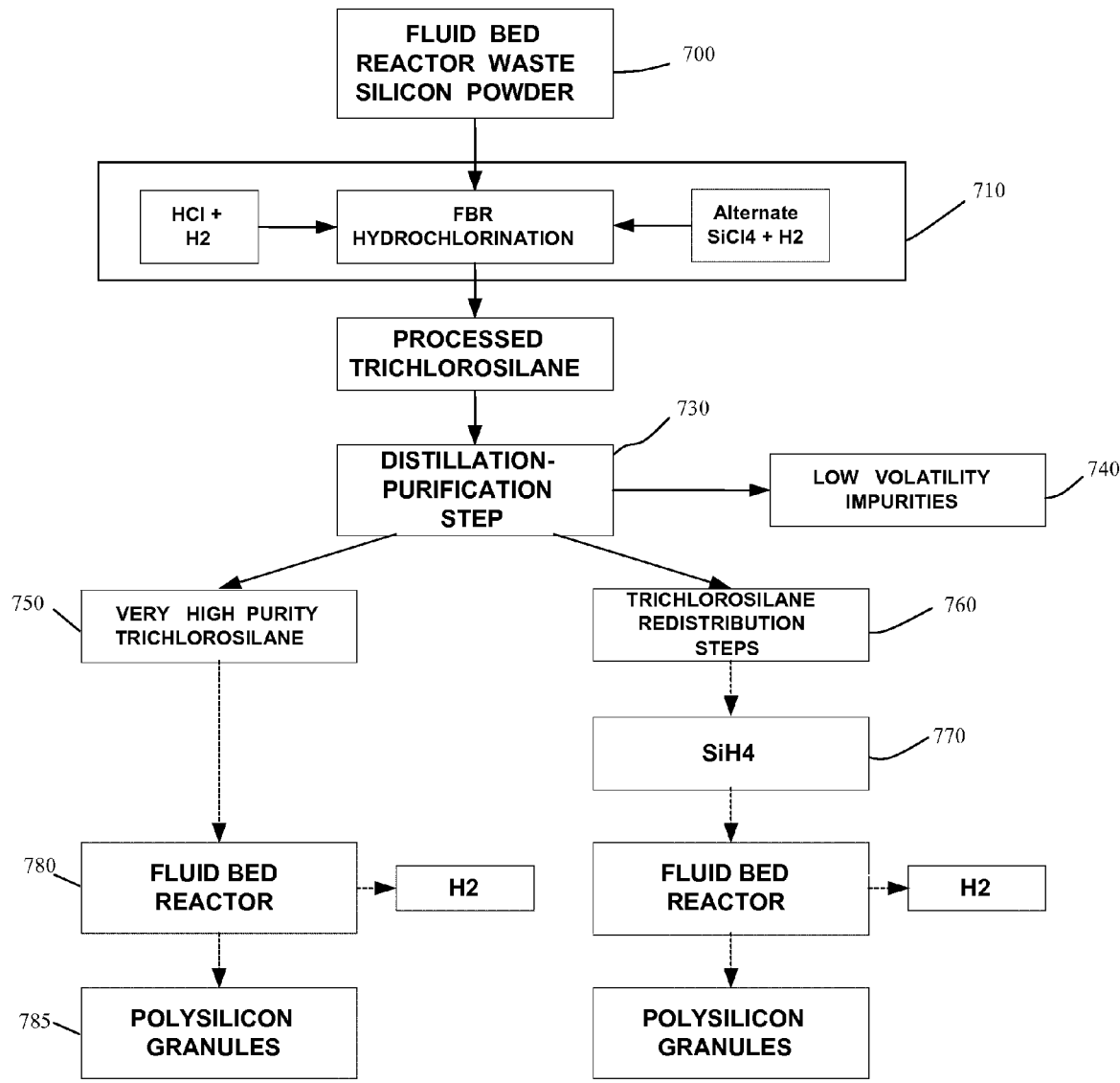

The process flow sheet to process silicon powder waste to granular polysilicon through the TCS and silane routes according to one or more embodiments of the present invention is shown in FIG. 7.

Figure 8:
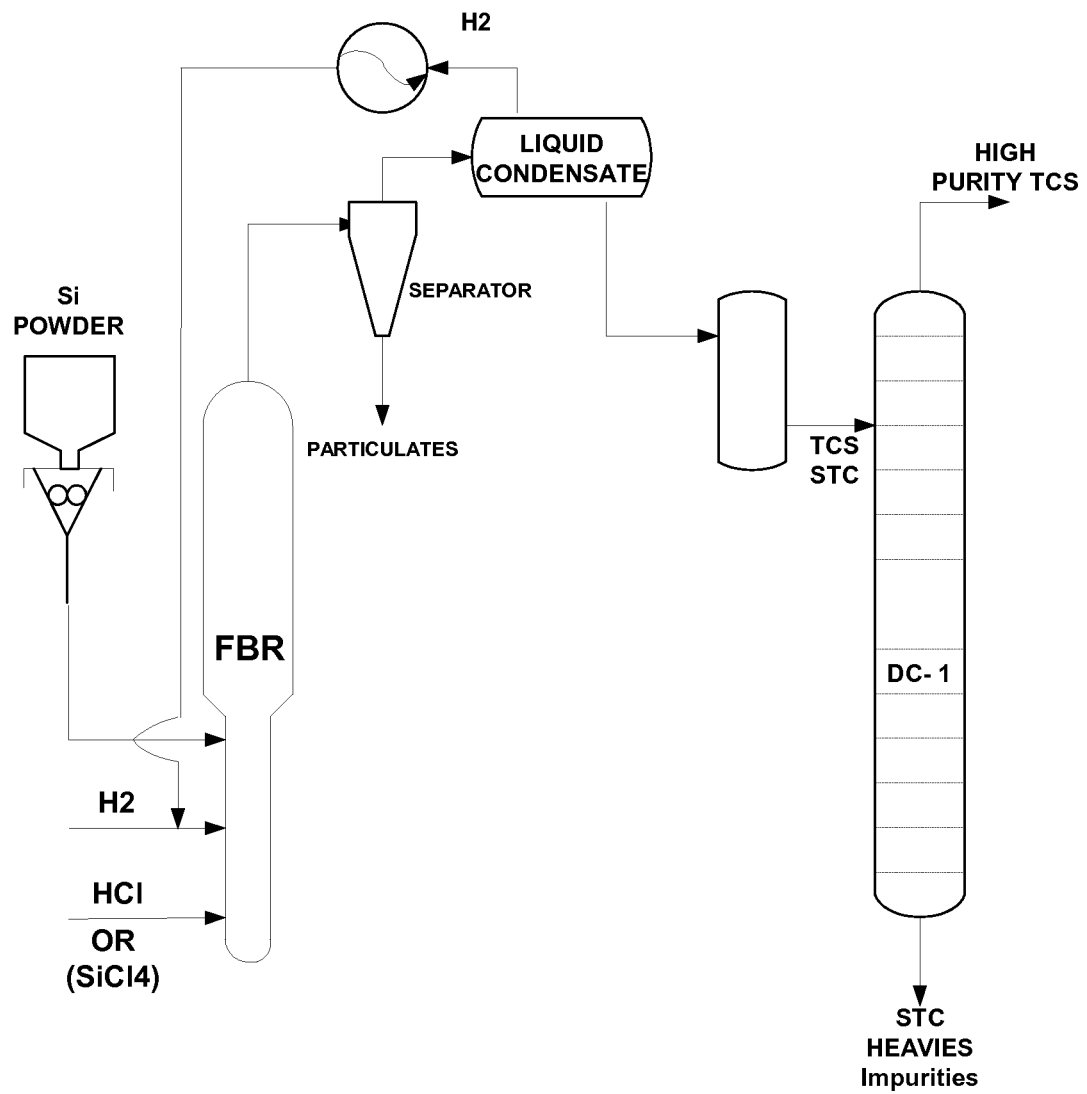

Chemical engineering schematics for the conversion of silicon powder to pure precursor gases TCS is shown in FIG. 8.

Figure 9:
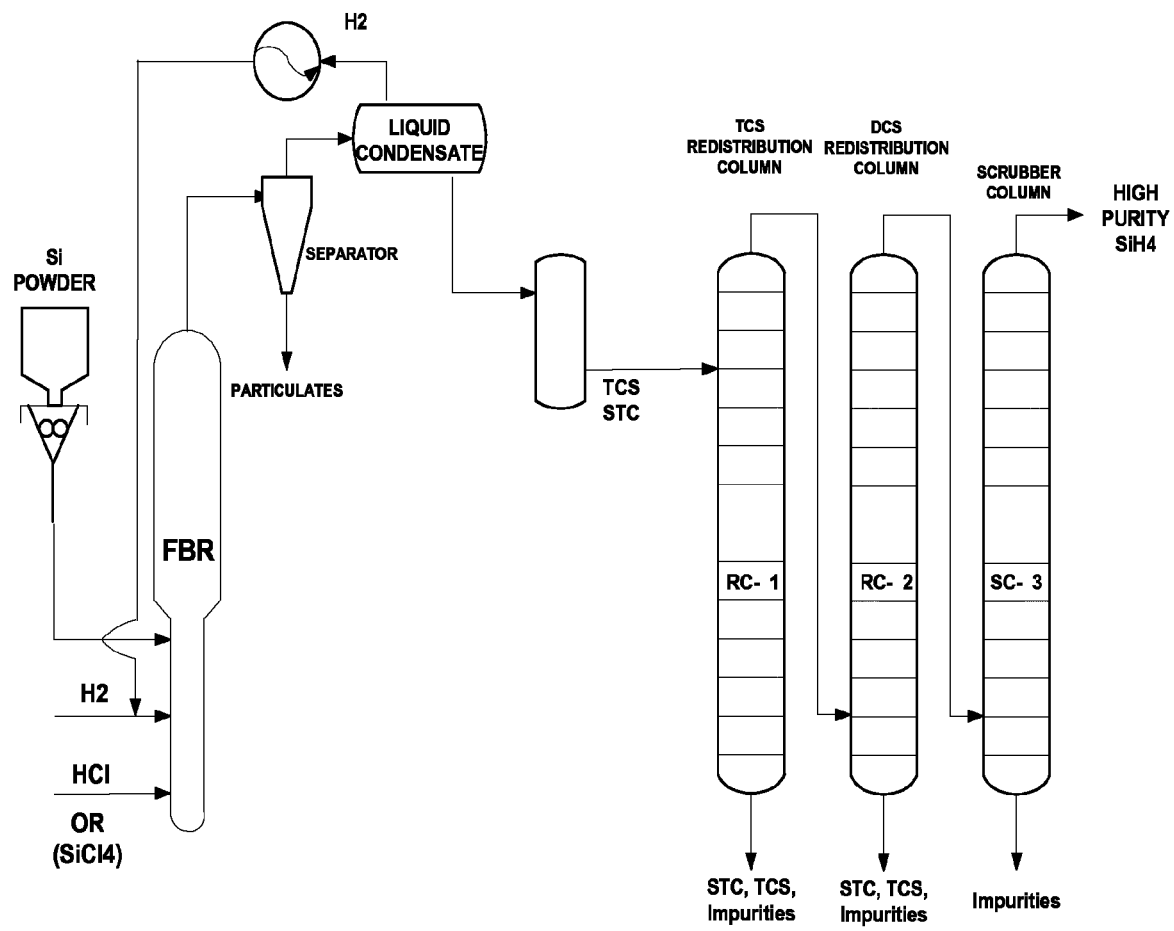

Chemical engineering schematics for the conversion of silicon powder to pure precursor gases silane is shown in FIG. 9.

Figure 10:
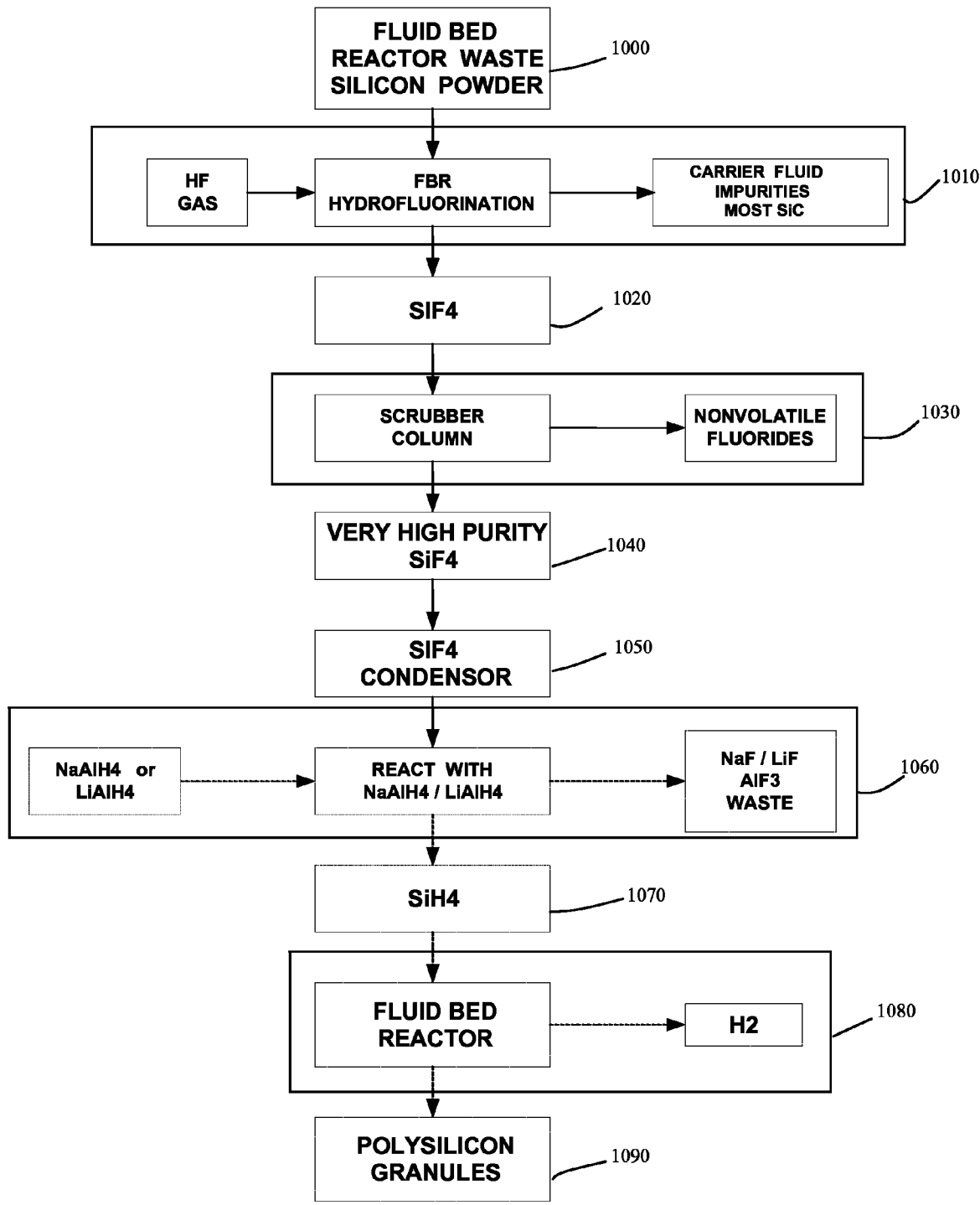

A process flow sheet to process silicon powder waste to polysilicon through the hydrofluorination route according to one or more embodiments of the present invention is shown in FIG. 10.

Figure 11:
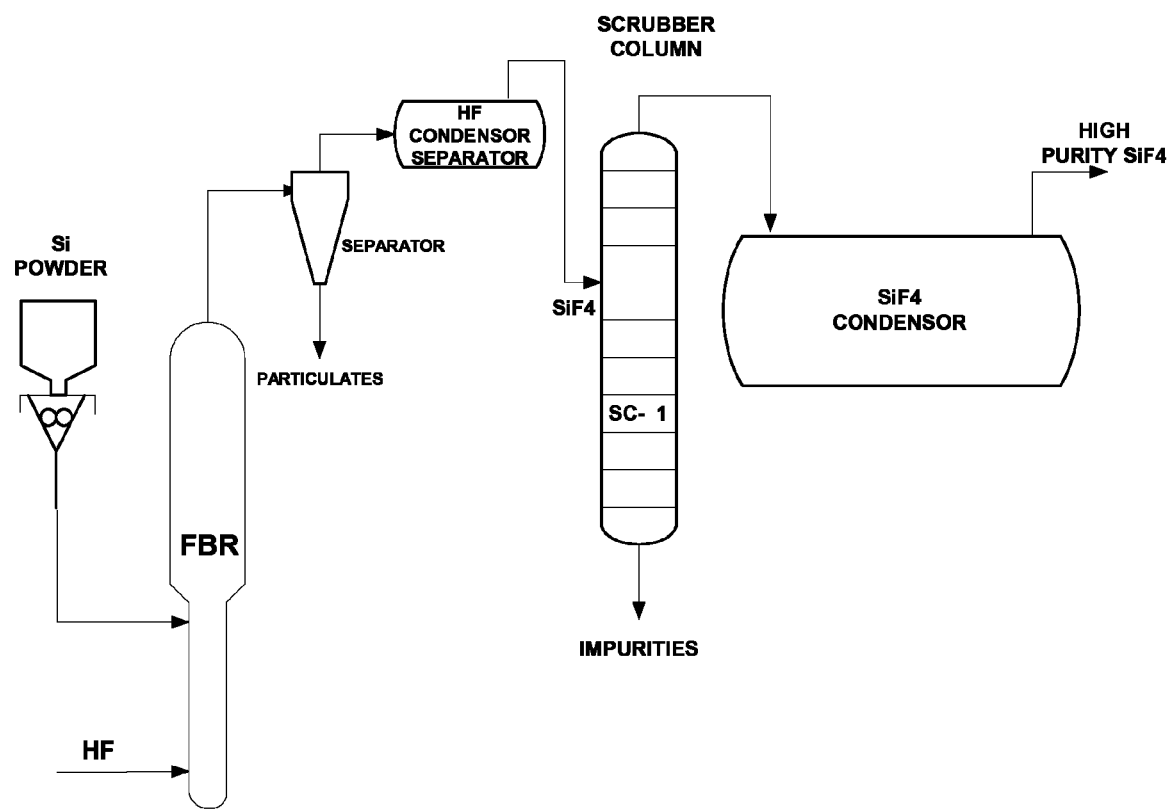

The chemical engineering schematic for the conversion of silicon powder to pure $SiF_4$ is shown in FIG. 11.

DEFINITIONS

As used herein, "semiconductor dopants" refers to the dopant elements found in semiconducting materials, which typically include III-V dopant elements such as the p-type group III acceptor elements B, Al, Ga and In and n-type group V donor elements In, P, As and Sb.

As used herein, "silicon manufacturing process" refers to both polysilicon manufacturing and silicon fabrications processes. Polysilicon manufacturing process includes producing bulk polysilicon for use as feedstock to electronic and photovoltaic industries, in particular to grow large silicon crystals. Silicon fabrication refers to utilizing such silicon crystals or ingots to produce wafers and other shapes by conventional mechanical (or machine shop) processes such as slicing, crushing, grinding, polishing, etc As used herein 'kerf silicon' refers to the silicon material produced during the cutting or grinding process, such as ingot shaping, wire saw slicing of silicon ingots to form silicon wafers, grinding and polishing of silicon wafers and silicon parts. It is typically contaminated with the abrasives and metals utilized to saw the ingot, the carrier fluid or other chemicals in the slicing, grinding and polishing medium, and other process elements.

As used herein 'kerf silicon waste' refers to the dry powder or cake kerf silicon as it is typically processed in preparation for disposal by the silicon fabrication industry. Carrier or polishing fluids are recovered from the kerf silicon; kerf silicon may also be treated to remove the bulk of the silicon carbide. However, residual carrier fluid and significant amounts of silicon carbide remain in the kerf silicon waste, as well as metallic and non-metallic impurities.

As used herein, "silicon (Si) powder" refers to a relatively high purity powder realized as a waste byproduct of the silicon granule manufacturing process in fluid bed reactors, and that resulting from dry crushing silicon chunks to produce smaller silicon pieces.

As used herein "high purity" means silicon material of >99.999 wt %, with less than 10 ppm by weight of metallic impurities.

DETAILED DESCRIPTION

A process for the recovery of silicon from a silicon fabrication or manufacturing process is described that provides silicon of a desired purity with minimal to low post-recovery purification. The method includes providing high purity silicon solids from a silicon manufacturing process, the silicon solids being substantially free of semiconductor dopants; converting the silicon solids into gaseous silicon forms; and collecting the gaseous silicon forms as a condensed liquid of a silicon-containing compound. The conversion step to gaseous silicon forms substantially removes impurities admixed with silicon in the waste from the fabrication or manufacturing process. The gaseous silicon forms may be used appropriately or eventually converted to polysilicon. The silicon can be of a purity suitable for solar [e.g., >99.999 wt % Si] or electronic [e.g., >99.99999 wt % Si] applications.

Silicon manufacturing processes generate huge amounts of silicon powder waste, which can be recovered and processed into high purity silicon according to one or more embodiments of the present invention. The broad concept of this invention is explained with reference to FIG. 3. The silicon waste 300 is in the form of powder and can be divided into two main categories. The largest fraction of waste powder is in kerf silicon slurry waste that results from a variety of silicon fabrication processes such as ingot shaping, slicing of wafers from shaped ingots, chemical-mechanical polishing (CMP) and back grinding of wafer, etc. The silicon powder waste as a result of these operations is in a slurry consisting of a working fluid such as polyethylene glycol (PEG), oil or water, and impurities such as abrasives (silicon carbide—SiC, diamond) metals from the wire saws or grinding wheels (iron, stainless steel, copper, zinc, aluminum, etc.). The industry removes materials of value from the slurry such as SiC and PEG for which processes have been developed. Silicon removal has proved intractable and thus it and the remaining impurities are ultimately reduced to a dry cake, kerf silicon, e.g., kerf silicon waste 310, that is disposed of in landfills.

The second category of silicon powder waste 320 comes from the production of silicon granules. Silicon granules are produced in a fluid bed reactor (FBR) by decomposition of silane, trichlorosilane or tribromosilane. Typically, about 15-20% of silicon does not grow into granules and form as powder only, which is a process waste. Granule size silicon particles are also produced by crushing silicon chunks, again resulting in some wastage as powder. Silicon crushing is typically a dry operation.

In some embodiments, the recovered waste silicon is used without further treatment. In other embodiments, the recovered silicon waste is pretreated. Optionally, physical and chemical pre-treatment steps are applied, as necessary, on the silicon powder wastes to clean surface impurities and for further removal of bulk impurities. In some embodiments, kerf silicon waste is subjected to treatment 330 that physically and/or chemically reduces the metallic and non-metallic impurities in the silicon source. Such treatments include density separation of particulate impurities such as abrasives, magnetic separation of magnetic impurities such as Fe, and chemical processing to reduce metal content and surface oxide content. In some embodiments, waste silicon powder is subjected to treatment 340 that chemically reduces the non-silicon impurity content of the source Si powder. Such processes include chemical treatment to reduce surface oxide content.

The dry silicon powder or powder mixture is then reacted with a halogen source to convert it into gaseous halosilanes 360. The conversion process can be effected by hydrochlorination, chlorination, hydrobromination, bromination, hydrofluorination or fluorination. The resultant product is a mixture of halosilanes having a high vapor pressure and volatility. Because the conversion is typically conducted at elevated temperatures, e.g. >200° C., the halosilicon forms are all gaseous in the conversion process. Typically, the condensation temperature of the halosilanes is at or above room temperature, so that they can be collected, if desired, as a condensed liquid.

In one or more embodiments, hydrogen chloride or silicon tetrachloride is used to react with silicon in a fluid bed reactor to form chlorosilanes. Depending on the reaction temperature, trichlorosilane with small amounts of other chlorosilanes are formed. The gaseous conversion step effects the separation of the silicon from the waste. The nonvolatile impurities, metal chloride reaction products and silicon carbide, are almost completely left behind. The resulting halosilanes can be processed as desired for a range of applications.

In one or more embodiments the source high purity silicon is kerf silicon waste. The kerf silicon, apart from the SiC and Fe contamination, is essentially very pure in quality, since it was derived from ultra high quality silicon crystal ingot grown from high purity polysilicon. The crystal itself is purer compared to the starting polysilicon feedstock since the crystal growth process results in segregation of many impurities. It will have no metallic and nonmetallic impurities, and especially no excess dopants, B and P. The material will have trace of surface oxidation from the process slurry, and is expected to be superficial in character, and not in the bulk. High purity polysilicon can be realized from the high quality silicon waste very effectively through a final conversion to trichlorosilane gas and with subsequent no or minimum distillation-purification steps. It will guarantee a polysilicon product of the specified quality for PV (Solar) Grade (SG)-Si or Electronic Grade (EG)-Si, as desired.

A method of converting kerf silicon waste into polysilicon is described with reference to FIG. 4. Kerf waste from a silicon cutting operation is a slurry consisting of an organic cutting fluid, typically polyethylene glycol, admixed with an abrasive, such as silicon carbide or diamond abrasive, used for sawing the wafer, material from the saw wire, typically brass-coated iron and steel or stainless steel, and fine silicon powder as kerf. Instead of polyethylene glycol, the kerf silicon slurry waste may include processing oils, such as machine oils and mineral oils. Because the kerf is the result of sawing crystal-grown very high purity silicon, it will not have the type or amount of metallic and nonmetallic impurities present in MG-Si. Slurry recovery operations separate out most of the SiC and PEG for reuse. The final kerf silicon waste 410 from the ingot wafer sawing/slurry recycle processes is estimated to be a mixture with only the abrasive SiC and carrier wire, typically Fe with traces of metallic and nonmetallic impurities and the carrier fluid, typically PEG. The particle size of this mixture is in the range of 1-20 microns. Typical dry kerf waste composition is 65 wt % Si, 35 wt % SiC, and less than 1 wt % of metals (e.g., Fe, Cu, Zn).

The process for purifying kerf silicon may utilize a minimum physical-chemical process to separate the bulk of SiC and Fe from the kerf waste and then clean the superficial oxide from the surface of the particles (process 415) to provide a kerf-processed silicon 420. The kerf-processed silicon is then converted to gaseous chlorosilanes, in particular TCS, in process 430. A Fluid Bed reactor at ~300-350° C., as is utilized in the conventional Siemens process, can be used for this purpose. Since the Si particle sizes are in the range 1-10 microns, its reactivity to HCl gas will be significantly higher than that of the conventional MG-Si grains. Thus, the conversion reaction can be carried out at a lower temperature, for example, in the range 200-250° C. The separation of bulk SiC from the kerf silicon is optional in this process scheme, since SiC at such conversion temperatures will not react with the HCl/$H_2$ process gas. Minor reaction with HCl gas will only cause to form chlorosilane from the SiC according to:

$$SiC(s)+3HCl(g)=SiHCl_3(g)+H_2(g)+C(s) \qquad [11]$$

Unreacted SiC can thus be separated and either discarded as a dry waste or sold as a refractory material to alternate industries.

The TCS from such a conversion process is subject to only a very minimum distillation—purification steps since it is bereft of any photovoltaic (PV)—critical impurities (step 450). The product TCS 460 can be utilized either in the Siemens rod deposition process or in the Fluid Bed granule deposition process to produce PV feedstock silicon, indicated in process step 470.

The silicon product from such a kerf recovery process is higher in purity than any level that can be achieved from the currently tried chemical-metallurgical recovery processes. Such silicon from chemical-metallurgical processes has impurity levels (in parts per million by weight) of Boron 1 ppm, Phosphorus 6 ppm, iron 75 ppm, Nickel 7 ppm, Chromium 12 ppm, Copper 35 ppm, Aluminum 35 ppm and Titanium 8 ppm, and significant carbon and oxygen and a silicon purity of <99.98 wt %, while PV-grade Polysilicon produced according to one or more embodiments can be >99.9999 wt %. Conventional processing of MG-Si to purity levels acceptable for solar and electronic applications typically requires 4-5 distillation steps. By requiring only a minimum and thus reduced number of otherwise costly distillation-purification steps, the TCS manufacturing process cost will be significantly reduced. Correspondingly, its effect on the polysilicon deposition cost will also be very significant since typical polysilicon deposition plant is always associated with a TCS plant equivalent to at least double the polysilicon output.

In FIG. 5, the physical-chemical pre-treatment steps on kerf silicon are described in greater detail. Kerf silicon waste 500 typically is contaminated with SiC, Fe, trace metallic and nonmetallic impurities, polyethylene glycol (PEG) and water. The kerf silicon waste first is treated in a physical process 510 in which the waste is washed with high purity deionized (DI) water to remove the carrier liquids. High purity water is of a purity that will not reintroduce impurities into the kerf silicon and in particular is free of dopant elements such as boron, phosphorus, arsenic and antimony. The kerf silicon can also be washed with an oil dissolvent (extractant) to remove any oils from an oil-based kerf silicon waste. The wash system can be a column type scrubber that will efficiently wash the kerf silicon solid phase by the wash liquid. The flow of the solid and liquid phases may be co- or counter current to each other, depending on the column design and operation. The walls of the column can be outfitted with magnetic strips to attract and remove iron and iron oxide solid materials if present as contaminants while the kerf silicon solid phase traverses the wash column and contacts the wash liquid and thus effect a level of purification of the kerf silicon.

The resulting water-based slurry, which contains SiC, Si and traces of metallic and nonmetallic impurities, can be subjected to an optional particle separation scheme 520. As noted below, this system is optional because abrasive, and in particular silicon carbide abrasives, can be separated by alternative methods. Density-based techniques based on centrifugation, flotation and momentum or a combination of these techniques may be used for the separation. While the absolute densities of Si (2.3 g/cc) and SiC (3.2 g/cc) are significantly far apart, the effective densities in the slurry from these two materials in ultra fine forms is expected to be lower, but will have the same margin of difference. Separation can remove substantially all the abrasive content from the silicon fraction. Typically, the silicon fraction can be brought from about 65 wt % to about 90 wt % Si and can contain less than about 10 wt %, or about 5-10 wt % SiC or other abrasive after separation. The separated SiC, with very small Si content, is discarded as process waste or sold as refractory material.

The silicon fraction, which contains about 5-10 wt % SiC if the latter is separated with the particle separation process, or roughly equal amount of SiC if the particle separation process was not utilized, and traces of metallic and nonmetallic impurities can be put through an optional chemical treatment 530 to remove bulk and surface impurities from the silicon particles. For example, a hydrochloric acid wash at ambient temperature is used to react, dissolve and remove iron, iron oxide, copper and zinc impurities from the kerf silicon. A hydrofluoric acid wash at ambient temperature is used to remove surface oxidation on the silicon particles. The effective oxide cleaning is according to:

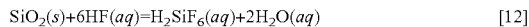

$$SiO_2(s)+6HF(aq)=H_2SiF_6(aq)+2H_2O(aq) \quad [12]$$

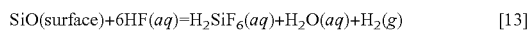

$$SiO(surface)+6HF(aq)=H_2SiF_6(aq)+H_2O(aq)+H_2(g) \quad [13]$$

The slurry, after the HF wash, is filtered and washed with high purity deionized (DI) water, of the type previously described, to provide a clean wet cake of silicon mixed with SiC and traces of metallic and nonmetallic impurities (processing step 540). The cake is dried (processing step 550), for example, at 150-200° C. in an inert gas environment such as helium, argon or nitrogen to produce a dry free flowing powder of recovered kerf silicon. The recovered kerf silicon 560 is substantially free of water and metallic and nonmetallic impurities. Recovered kerf silicon 560 typically includes a free-flowing silicon powder having a particle size in the range of 1-10 μm and about 5-10 wt % SiC. The silicon powder contains only trace amounts surface oxide and metallic and non-metallic impurities, e.g., <1 wt % metallic impurities, about 5-10 wt % SiC and the balance Si.

The recovered kerf can serve as a substitute for MG-Si for producing halosilanes or polysilicon thereof since it is free of excess dopants. It can find other valuable uses too, such as to manufacture silicon carbide, silicon carbonitride, silicon oxy-carbide and similar ceramic materials.

The dried free flowing recovered kerf silicon powder forms the feed material for the next process step 570. In this process step, the silicon containing feed is hydrochlorinated in a conventional fluid bed reactor. The gas stream is a mixture of HCl and hydrogen. The process is similar to what is currently practiced with MG-Si. However, since the particle size of the solid material is in the range 1-10 microns, a process temperature lower than the typical 300-350° C. may be more appropriate. It is expected that the hydrochlorination can be achieved at 200-250° C.

Although the reaction can be performed in a conventional fluid bed, other process schemes are equally appropriate, such as inert fluid bed, circulating fluid bed, stirred bed, bubble bed, etc. and where the main intent is an efficient gas-solid reaction to form the trichlorosilane product, while preventing temperature excursions that will cause the feed material to form hard cakes. A further opportunity to remove SiC from the process is presented, as the SiC is generally non-reactive to hydrochlorination and can be separated as an unreacted solid residue from the gaseous reaction product. The product will essentially be TCS, with very small concentration of $SiCl_4$ and $SiH_2Cl_2$.

The purification of the formed trichlorosilane will follow the technology presently utilized in the Siemens polysilicon process. After hydrochlorination the TCS product is separated from nonvolatile metal chlorides and process HCl and $H_2$ gas in a metal chlorides separation step 580. Subsequently the recovered TCS 590 can undergo a minimum but appropriate distillation purification to remove high boiling and low boiling impurity chloride that are specifically deleterious to the end use of the converted polysilicon, as is described in FIG. 6.

Advantageously, NO or only ONE distillation-purification step will be necessary to produce a TCS fraction that is of the appropriate specification for converting into PV-grade SG-Si. If, however, higher grade EG-Si is desired, an additional distillation-purification step for the TCS can be added. In either case, the number of costly distillation-purification processing of TCS is significantly reduced, and thus the overall cost of conversion to high purity polysilicon is also correspondingly reduced.

The further steps of making high purity silicon ingots from the high purity trichlorosilane are conventional and known to those familiar with the polysilicon production industry. The high purity polysilicon is subjected to crystal growth process. The crystal growth processes include methods such as Czochralski (CZ), Heat Exchanger Method (HEM), Directional Solidification System (DSS), or other. The formed crystalline silicon ingot or block is then sawed to produce silicon wafers.

While this embodiment is described with reference to hydrochlorination, it will be readily apparent that other systems can be used to convert the silicon into a gaseous halosilanes. By way of example, the conversion process can be effected by hydrochlorination, chlorination, hydrobromination, bromination, hydrofluorination or fluorination. Further details of such processes are described in detail below.

While described with specific reference to kerf silicon waste from PEG-based wire saw process that utilizes SiC abrasive, the process is adaptable to other wire saw processes, such as use of SiC or diamond abrasive in an oil based system. In such cases the residual oil from the kerf silicon waste can be extracted with an organic extractant, followed by the process scheme described in this invention. The diamond residue in the slurry is also amenable to the same separation process as the SiC. The diamond residue may not also need to be separated from the silicon, since it does not react with the hydrochlorination gas stream at low process temperatures.

This process also can be used, for example, with kerf silicon material produced in the inner diameter saw (ID saw) slicing of silicon ingot into wafers.

This process also is applicable to silicon material lost while shaping the ingot prior to slicing into wafers and in the lapping and chemical-mechanical polishing of semiconductor wafers. One common process is backgrinding of wafers with diamond abrasive-coated wheels and deionized (DI) water for cooling fluid. While the water is substantially recovered, silicon dust along with abrasive residues is at present lost as process waste. However, unlike the slurry resulting from silicon wafer slicing, the slurry from various chemical-mechanical polishing steps on different wafer types are often combined into a common waste stream. If silicon recovery from such a slurry waste is to be accomplished, it will require the monitoring, separation and perhaps pretreatment of the specific wastes before the methods of the present invention can be applied.

Although the process is exemplified by a process intended primarily to convert the recovered kerf silicon into trichlorosilane, for deposition of polysilicon in a Siemens reactor, it is equally amenable for use in Fluid Bed type of reactor for polysilicon deposition. Similarly, the trichlorosilane at an appropriate purification level can be disproportionated to dichlorosilane or silane. They can be utilized for polysilicon deposition in a Siemens reactor to form polysilicon chunks or in a Fluid Bed reactor to form polysilicon granules. All such variations will be cost effective compared to chemical-metallurgical routes to recover the kerf silicon into PV-usable form.

In another aspect, the process is also applicable to recovering the silicon powder waste by-product of high purity silicon granule manufacturing processes 700 in Fluid Bed Reactors or from crushing high purity polysilicon ingots, as shown in FIG. 7. Such silicon powder wastes, apart from minor metallic and non metallic impurities picked up as superficial contamination from the process systems, is essentially very pure in quality, with >99.999% silicon, and typically (in parts per million by weight)<2 ppm of transition metals, <20 ppm Carbon, <850 ppm Oxygen and <75 ppm Hydrogen impurities. It will have especially no excess dopants B and P as impurities. The material will have trace of surface oxidation from exposure of the powder to ambient air, and which is expected to be superficial in character, and not in the bulk.

In one or more embodiments, the waste silicon powder 700 is recovered from a polysilicon manufacturing process as a dry powder. In other embodiments, traces of nonmetallic surface impurities on the silicon particles can be removed through an optional chemical treatment. For example, a hydrofluoric acid wash at ambient temperature is used to remove surface oxidation on the silicon particles.

The silicon powder waste is converted to a gaseous silicon intermediate. As shown in processing box 710, the silicon powder can be reacted with hydrogen chloride and hydrogen gas, or alternatively with silicon tetrachloride and hydrogen gas in a fluid bed reactor hydrochlorination or chlorination process to obtain chlorosilanes 720. The chlorosilanes can be processed as described above for the case of kerf silicon to remove non-volatile impurities and/or volatile impurities. By way of example, the chlorosilanes can be subjected to purification by distillation 730 to remove tetrachorosilane and dichlorosilane from the gaseous mixture and provide a high purity trichlorosilane 750. Low volatility impurities such as metal chlorides can be removed as shown in process box 740, either by distillation or in a filter bed. See also FIG. 8 for an engineering diagram of the formation of high purity trichlorosilane. Similarly, the trichlorosilane at an appropriate purification level can be disproportionated to dichlorosilane or silane, as shown in process box 760 to provide silane 770. See also FIG. 9 for an engineering diagram of the formation of high purity silane.

Trichlorosilane can be further processed in a Siemens reactor (780) to deposit polysilicon (785). Similarly, silane can be processed in Fluid Bed type of reactor (790) for polysilicon deposition (795). They can be utilized for polysilicon deposition in a Siemens reactor to form polysilicon chunks or in a Fluid Bed reactor to form polysilicon granules.

The above process provides a method for significantly increasing the yield of high purity polysilicon granules from a given amount of source silicon. Ultra fine silicon powder is produced as a by-product of the Fluid Bed process to manufacture high purity polysilicon granules, in which silicon is deposited by heterogeneous thermal decomposition of silane gas on granules of silicon seed particles. The efficiency of the process to produce usable millimeter diameter granules is in the range 80-85%, which results in a large quantity, 15-20%, of ultra fine silicon dust as waste.

In one or more embodiments, the above described process in used to enable recycling the waste silicon from polysilicon manufacture, thereby improving the yield of polysilicon production by the Fluid Bed Reactor method utilizing trichlorosilane or silane as the deposition gas. In one or more embodiments, a method of high yield fluidized bed silicon production includes introducing silane in a fluidized bed process for the manufacture of silicon granules; collecting silicon powder from the silicon granule manufacturing process waste; converting the waste silicon powder into trichlorosilane; subjecting the trichlorosilane to redistribution reactions to form silane; and recycling the silane produced from waste silicon powder into the fluidized bed silicon granule manufacture process. The process enables recycling the waste silicon dust into the existing manufacturing process, and effectively improves the overall yield of the process to >97%.

The methodology according to one or more embodiments of the present invention is also applicable to directly convert kerf silicon and other high purity silicon powder into an alternate gaseous precursor material such as bromosilanes prior to their use for polysilicon deposition. Hydrobromination of kerf recovered silicon or silicon powder with a gas stream of HBr and hydrogen, or bromination with $SiBr_4$ and hydrogen will produce tribromosilane (TBS) through reactions 14 and 15:

$$Si(s)+3HBr(g)=SiHBr_3(g)+H_2(g) \tag{14}$$

$$Si(s)+3SiBr_4(g)+2H_2(g)=4SiHBr_3(g) \tag{15}$$

The conversion to tribromosilane may be effected in a Fluid Bed reactor or other such process systems for efficient and controllable gas-solid reaction at 200-400° C. for the hydrobromination reaction [14], or 300-600° C. for the bromination reaction [15]. The product tribromosilane is amenable to selective purification by distillation, and subsequent conversion to polysilicon deposition at 850-1100° C.

In another aspect, the methodology of the present invention is also applicable to directly convert high purity silicon powder into an alternate gaseous precursor material such as $SiF_4$ prior to conversion to silane gas. Waste silicon powders can be used in a fluorination process to obtain silicon tetrafluoride ($SiF_4$), which is then converted to silane gas to produce polysilicon granules from silane in a Fluid Bed Reactor. With reference to FIG. 10, waste silicon powder 1000 is obtained as described hereinabove. The silicon powder 1000 is used in a hydrofluorination or fluorination reaction 1010 to convert silicon powder to $SiF_4$ according to:

$$Si(s)+4HF(g)=SiF_4(g)+2H_2(g) \quad [16]$$

$$Si(s)+2F_2(g)=SiF_4(g) \quad [17]$$

The conversion of the silicon powder to silicon tetrafluoride may be effected in a Fluid Bed reactor or other such process systems for efficient and controllable gas-solid reaction at 200-750° C. for the hydrofluorination reaction [16], or 200-500° C. for the fluorination reaction [17]. Typically, the reactant gases need to be diluted with an inert carrier gas.

The $SiF_4$ from such a conversion process will need no purification steps, except to remove nonvolatile metal fluorides and excess unreacted HF or $F_2$ gas by filtration and selective condensation processes. Typical impurity metals in polysilicon form fluorides that have very low vapor pressures. Thus, the separation and purification of $SiF_4$ (mp −90.2° C., bp −86° C.) from these impurities are very easy since $SiF_4$ is extremely volatile. Only potentially interfering fluorides are $BF_3$ (mp −126° C., bp −100.3° C.) and $PF_3$ (mp −151.5° C., bp −101.8° C.). However, since the feed material does not contain any excess dopant impurities such as boron and phosphorus, no separation from the fluorides of these elements are required. Similarly, since the silicon powder waste is also bereft of any PV-critical impurities, no specific purification process step is warranted. Thus, a simple removal of the gaseous $SiF_4$ will effectively provide an efficient recovery of silicon from the silicon powder waste. As shown in FIG. 10, the as formed $SiF_4$ (1020) is collected and separated from lower volatility and non-volatile impurities (1030). This can be accomplished by removal of volatile $SiF_4$ from the non-volatile fluorides to provide a high purity $SiF_4$ (1040), which can be collected by condensation (1050) for further processing.

The $SiF_4$ can then be converted to silane ($SiH_4$) gas according to standard industrial processes such as by hydride reduction of $SiF_4$ to $SiH_4$ using sodium or lithium aluminum hydride (1060). Other conventional processes are contemplated. The silane (1070) is then decomposed to polysilicon granules in a fluid bed reactor as is practiced in the polysilicon industry (1080). The silicon product from such a powder-recovery process, shown in FIGS. 10 and 11, will be of high purity in character (1090).

The above process provides a method for significantly increasing the yield of high purity polysilicon granules from a given amount of source silicon. In one aspect, a method of high yield fluidized bed silicon production includes introducing silane in a fluidized bed process for the manufacture of silicon granules; collecting silicon powder from the silicon granule manufacturing process waste; converting the waste silicon powder into silicon tetrafluoride; reacting the silicon tetrafluoride to form silane; and recycling the silane produced from waste silicon powder into the fluidized bed silicon granule manufacture process. The process enables recycling the waste silicon dust into the existing manufacturing process, and effectively improves the overall yield of the process to >97%.

The methodology of converting high purity silicon powder to $SiF_4$ is also applicable to separate the impurities from kerf silicon waste and directly recover silicon as pure $SiF_4$. The purified $SiF_4$ may be converted to high purity silane gas for use in polysilicon deposition.

Other and various embodiments of the methodology described in this invention will be evident to those skilled in the art from the specification of this invention. Those skilled in the art will recognize or be able to ascertain using no more than routine experimentation, many equivalents to the specific embodiments of the invention described specifically herein. Such equivalents are intended to be encompassed within the scope of the following claims.

What is claimed is:

1. A method of converting kerf silicon waste to high purity silicon comprising:
   selecting kerf silicon waste to be converted to high purity silicon, wherein the kerf silicon waste comprises silicon powder having an average particle size in the range of 1-10 microns and about 5 to 35 wt % silicon carbide impurities, wherein said silicon powder comprises less than 1 wt % metallic and nonmetallic impurities;
   converting said silicon powder into halosilanes with a mixture of hydrogen chloride and hydrogen gas between 200-250° C., wherein substantially all of said silicon carbide impurities remain unreacted;
   separating said halosilanes from said unreacted silicon carbide impurities; and
   converting the separated halosilanes to high purity silicon, wherein the high purity silicon is at least a photovoltaic-grade silicon.

2. The method of claim 1, further comprising separating impurities from the kerf silicon waste to obtain a silicon enriched powder, wherein said separating impurities from the kerf silicon waste comprises one or more of:
   (a) reducing the carrier fluid from the kerf silicon waste;
   (b) reducing metallic impurities from the kerf silicon waste;
   (c) reducing the abrasive content from the kerf silicon waste;
   (d) reducing oxidized material from the kerf silicon waste; and
   (e) washing and drying the kerf silicon waste.

3. The method according to claim 1, wherein the process is performed primarily in a bed reactor.

4. The method according to claim 1, wherein the halosilanes are decomposed in a silicon deposition process to deposit polysilicon or a silicon thin film.

5. The method according to claim 1, wherein the kerf silicon waste comprises high purity silicon, residual wire saw slurry and wire saw material.

6. The method according to claim 5 wherein the residual wire saw slurry comprises a liquid carrier and an abrasive.

7. The method according to claim 6, wherein the liquid carrier is selected from the group consisting of polyethylene glycol, water and oil and mixtures thereof.

8. The method according to claim 6, wherein the abrasive is selected from the group consisting of silicon carbide and diamond and mixtures thereof.

9. The method according to claim 5, wherein the residual wire saw material is selected from the group consisting of iron, steel, stainless steel, brass coated iron, brass coated steel, brass coated stainless steel, or a combination of these.

10. The method according to claim 1, further comprising submitting the halosilanes to a distillation process to remove non-volatile and volatile impurities.

11. The method of claim 10, wherein the non-volatile impurities comprise metal halide-containing impurities and silicon carbide.

12. The method according to claim 11, wherein the non-volatile impurities comprise metal halides and the metal halides are separated in a filter bed.

13. The method according to claim 1, further comprising washing the kerf silicon waste with water to remove water soluble impurities of the kerf silicon waste.

14. The method according to claim 1, further comprising washing the kerf silicon waste from oil-based wire saw process with an organic liquid extractant to remove oil.

15. The method according to claim 1, further comprising reducing magnetic metallic impurities in the kerf silicon waste by a magnetic separation system.

16. The method according to claim 1, further comprising reducing metallic impurities in the kerf silicon waste by treating with acid to dissolve the metals.

17. The method according to claim 1, further comprising reducing the abrasive content of the kerf silicon waste by a density-based process.

18. The method according to claim 17, wherein the density-based process is selected from the group consisting of centrifugation, flotation and momentum-based separation techniques.

19. The method according to claim 1, further comprising washing the kerf silicon with the abrasive content with hydrofluoric acid to reduce oxidized silicon.

20. The method according to claim 19, wherein the hydrofluoric acid washed kerf silicon is washed with high purity water to remove hydrofluoric acid from the silicon.

21. The method according to claim 2, wherein the kerf silicon waste is dried in an inert gas environment.

22. The method of claim 1, wherein the halosilanes comprise chlorosilanes.

23. The method according to claim 22, wherein the silicon powder is hydrochlorinated to form chlorosilanes.

24. The method according to claim 22, wherein the chlorosilanes comprise trichlorosilane and trichlorosilane is purified by distillation process to remove non-volatile and volatile impurities.

25. The method of claim 24, wherein distillation to remove volatile impurities comprises separation of the trichlorosilane from dichlorosilane and tetrachlorosilane.

26. The method of claim 22, wherein the chlorosilanes comprise trichlorosilane and the method further comprising:
submitting the trichlorosilane to redistribution reactions to enrich the product in silicon content.

27. The method of claim 26, further comprising converting the silicon enriched product into the high purity silicon.

28. The method according to claim 27, wherein the silicon enriched product is decomposed in a silicon deposition process to deposit polysilicon or a silicon thin film.

29. The method of claim 1, wherein the kerf silicon waste comprises silicon particles having an average particle size in the range of 1-10 microns, about 5-10 weight % SiC; and
less than 1 wt % metallic and nonmetallic impurities, and wherein the surface of the silicon particles is substantially free of oxides.

30. A method of producing polysilicon comprising:
selecting kerf silicon waste to be converted to high purity silicon, wherein the kerf silicon waste comprises silicon powders having an average particle size in the range of 1-10 microns and about 5 to 35 wt % silicon carbide impurities, wherein said silicon powder comprises less than 1 wt % metallic and nonmetallic impurities;
converting said silicon powders into trichlorosilane with hydrogen chloride and hydrogen gas between 200-250° C., wherein substantially all of said silicon carbide impurities remain unreacted;
separating said trichlorosilane from said silicon carbide impurities; and
converting said trichlorosilane to polysilicon, wherein said polysilicon is at least photovoltaic-grade polysilicon.

31. The method of claim 30, further comprising:
submitting the trichlorosilane to redistribution to form silane gas.

32. The method of claim 30, wherein the trichlorosilane is subjected to one distillation purification process.

33. The method of claim 30, wherein no distillation step is employed.

34. The method of claim 30, wherein the polysilicon is a solar grade polysilicon.

35. The method of claim 30, wherein the polysilicon is an electronics grade polysilicon.

36. The method of claim 30, wherein the trichlorosilane is subjected to two distillation purification processes.

* * * * *